(No Model.)

G. T. CHAPMAN.
VEHICLE SPRING.

No. 503,761. Patented Aug. 22, 1893.

WITNESSES:
John Buckler,
W. J. Morgan

INVENTOR
Geo. T. Chapman
BY
A. P. Thayer
ATTORNEY

UNITED STATES PATENT OFFICE.

GEORGE T. CHAPMAN, OF NEW YORK, N. Y., ASSIGNOR TO WILLIAM HARVEY MERRITT, OF SAME PLACE.

VEHICLE-SPRING.

SPECIFICATION forming part of Letters Patent No. 503,761, dated August 22, 1893.

Application filed October 20, 1892. Serial No. 449,447. (No model.)

*To all whom it may concern:*

Be it known that I, GEORGE T. CHAPMAN, a citizen of the United States, and a resident of New York city, in the county and State of New York, have invented certain new and useful Improvements in Wagon-Springs, of which the following is a specification.

My invention relates to mounting semi-elliptical cross-springs on the side bars or other supports in a side bar or other wagon, and is designed to provide a simpler and more effective way of mounting such springs so as to provide for the lengthening and shortening of the springs without lateral play of the body, and it consists of said springs hooked or looped at both ends over a bearing support as a roller so that both ends lodge against the support in opposing relation to each other in the shortest condition of the spring and center the body on the wagon, the said hooks or loops being thrust outward alike by the extensions of the springs so that the body remains in the central position entirely free of vibration on account of the action of the springs, all as hereinafter fully described reference being made to the accompanying drawings, in which—

Figure 1:
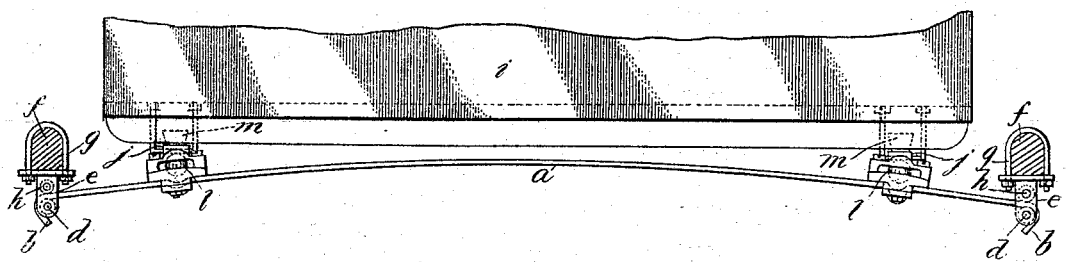
Figure 2:
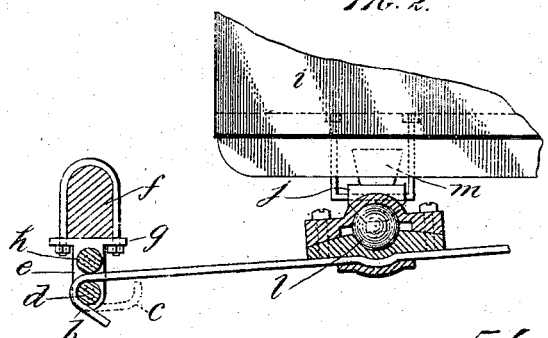
Figure 3:
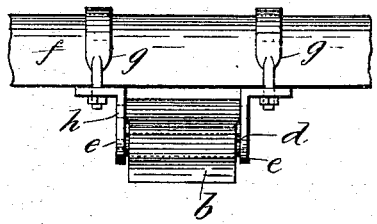
Figure 4:
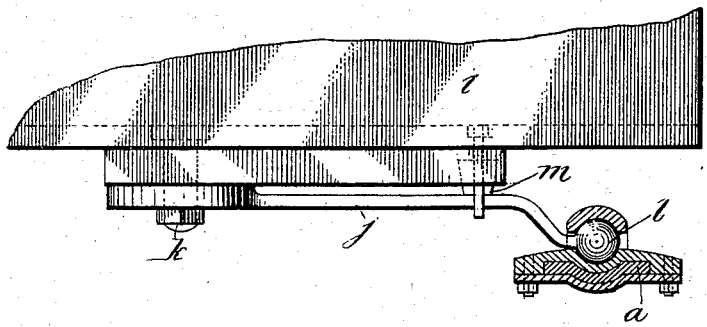

Figure 1, is a front elevation of a box and transverse section of the side bars of a wagon in which the spring is mounted in accordance with my invention. Fig. 2, is a similar view of part of the same on a larger scale with the spring in section. Fig. 3, is a side view of part of the devices of Fig. 1. Fig. 4, is a side view of some of the parts and transverse section of the spring and other parts showing the manner of mounting the body on the spring.

I make the spring *a*, with hook ends as *b*, or with loops as indicated by the dotted line *c*, Fig. 2, and suspend the spring by engaging the hooked or looped ends on rollers *d*, or other supports, said roller when used being pivoted in suitable bearings *e*, which are in this case suspended from the side-bars *f*, by clips *g*, but may be attached to the side-bars or other supports in any approved way, said hooks or loops being in such relation to the length of the spring that in the normal light condition of the wagon and shortest condition of the spring they lodge against the rollers in opposing relation to each other and center the body on the wagon, and what extension of the spring occurs by the load and by shocks, thrusts the hooks or loops outward, the recoil effecting reverse movements.

The rollers lessen the friction largely and they afford more substantial and satisfactory means of facilitating the lengthwise variations of the spring than slide ways or the vibrating link suspending device commonly used.

The rollers *d*, may be mounted sufficiently close under the side bar, for the side bar to form a guard over the spring, to prevent the spring from escaping over the rollers by shocks, or another roller *h*, may be mounted over the spring, in which case it will be preferred to arrange it in contact with the spring for confining it snugly, to prevent rattling, or a spring may be used for such guard.

The body *i* is mounted on the springs by the bearing brackets *j*, pivoted at one end under the body at *k*, and at the other end coupled to the spring by a ball and socket joint *l*, with a bearing block *m*, preferably of elastic material interposed between said bracket and body near the spring, but this is the subject of another application for a patent filed at the same time with this and is not claimed herein, and therefore is not specifically described. But the manner of mounting the body on the springs at intermediate points between the center and the ends of the springs with the middle portions of the springs free to vibrate is especially favorable to the manner of suspending the springs on their end supports with the ends of the springs free to extend beyond and recoil against the supports, in that the body has about double the vertical play with a given amount of lengthwise extension and contraction of the springs as when the body is mounted on the crown of the springs, because in this way the range of the vertical play of the body and the springs extends about as much below the horizontal plane of the supports for the ends of the springs as above. The amount of the extension of the ends of the springs is not therefore as objectionable because of the liability of the body to side thrusts when the springs are in that condition for such thrusts will be only half what they would otherwise be.

I am aware of the Patent No. 392,063 in which side springs pivoted so as not to have lengthwise movement on the hind axle have the front end hooked over a roller mounted on the bolster in a manner whereby lengthwise movement of the springs is positively subject to the fixed position of the one end and causes corresponding forward and backward movement of the body mounted on the springs, and in which the hook end has no function other than a straight end portion would have, and I do not claim such device.

I am also aware of the Patents Nos. 144,514 and 151,097 in which there are cross springs the lengthening movements of which are subject to the opposing action of rubber cushions at the ends for controlling the position of the body, which are liable to interfere with the desired freedom of action of the springs, and require tension rods to stay the side bars, or branches of said bars for relief, besides being much more expensive and liable to get out of order, and I do not claim such devices.

I claim—

1. In a wagon, the cross springs supporting the body hooked over and suspended at both ends on supports attached to the side bars or other part of the wagon, with the said ends free to extend by the elongation of the springs, and to hook and lodge directly against the supports by the contraction of the springs substantially as described.

2. In a wagon, the cross springs supporting the body at intermediate points between the center and the ends of the springs, and said springs suspended at both ends on supports attached to the side bars or other part of a wagon, with the said ends free to extend by the elongation of the springs, and to hook and lodge directly against the supports by the contraction of the springs the springs being free to vibrate between the supports of the body thereon substantially as described.

Signed at New York city, in the county and State of New York, this 30th day of September, A. D. 1892.

GEO. T. CHAPMAN.

Witnesses:
W. J. MORGAN,
C. E. WHITNEY.